Feb. 3, 1948.         D. W. WIREBAUGH         2,435,417
COMPENSATING CENTER SUPPORT.
Filed June 26, 1945        2 Sheets-Sheet 1
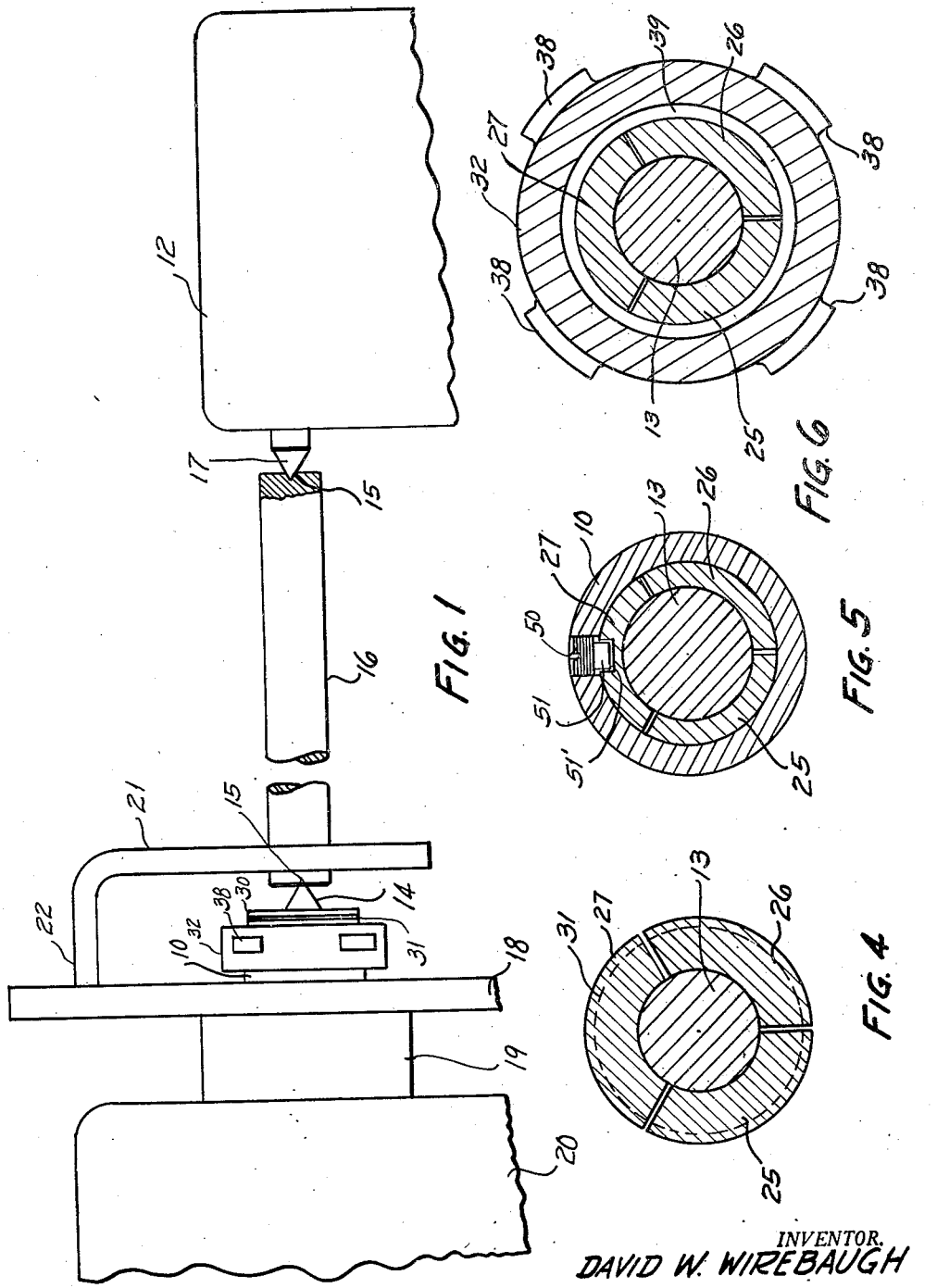
INVENTOR.
DAVID W. WIREBAUGH
BY
Clarence B. DesJardins
HIS ATTORNEY

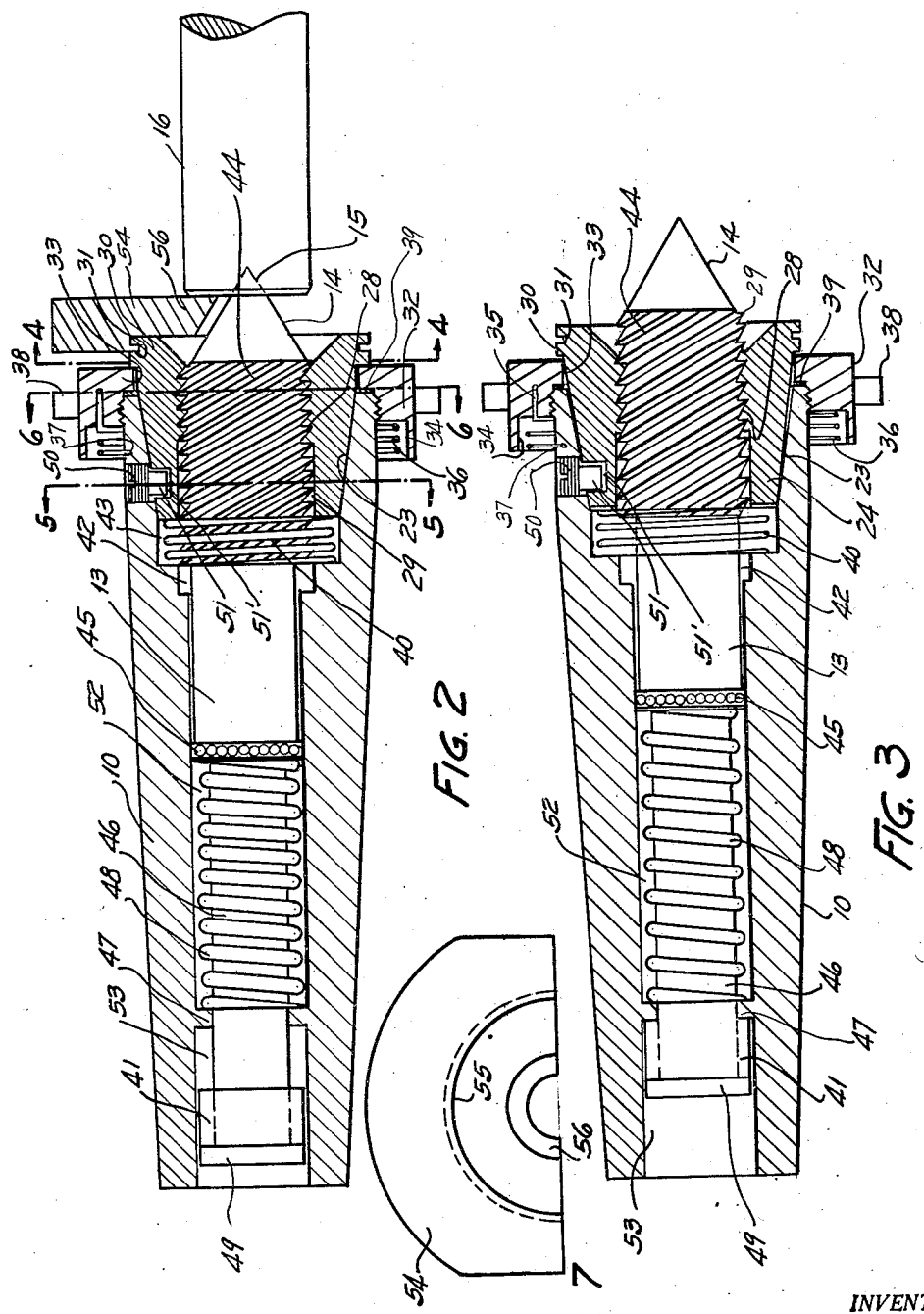

Patented Feb. 3, 1948

2,435,417

UNITED STATES PATENT OFFICE 2,435,417

COMPENSATING CENTER SUPPORT

David W. Wirebaugh, Cincinnati, Ohio

Application June 26, 1945, Serial No. 601,574

17 Claims. (Cl. 82—33)

My invention relates to improvements in compensating center support and has to do, more particularly, with an adjustable or compensating center support for rotatably supporting and locating a work piece in a lathe, grinder or like machine.

It is customary to support the work piece in a lathe or grinder by means of center supports, so that the work piece is revoluble about a longitudinal axis. For that purpose, conical center holes are formed in the ends of the work piece, in which the conical tips of the center supports engage. However, there is considerable irregularity, in practice, in the formation of these center holes in the work pieces, some of them being too deep and others being too shallow and since, according to the usual practice, the positioning of the work piece in the machine depends upon the depth of the center hole, these variations in depth of the center hole result in irregularities in the positioning of the work piece.

The principal object of my invention is to provide a compensating center support for a work piece, of such construction that the work piece will be positioned and located accurately in the lathe or grinder, notwithstanding variations in the depth of the center hole.

A further object of my invention consists in providing an adjustable center support, together with automatic means for clamping the support in adjusted position upon movement of the work piece to a predetermined position.

A further object of my invention is to provide a compensating center support of such nature that the center hole in the work piece may be engaged with the conical tip of said support, and the latter adjusted longitudinally by movement of the work piece until it reaches a predetermined position, when the center support will be locked against further adjustment.

Another object of my invention consists in providing such a compensating center support provided with quick acting means for releasing it to permit it to be projected upon removal of the work piece.

Further objects, and objects relating to details of construction and economies of operation, will definitely appear from the detailed description to follow. In one instance, I have accomplished the objects of my invention by the devices and means described in the following specification. My invention is clearly defined and pointed out in the appended claims. A structure constituting a preferred embodiment of my invention is illustrated in the accompanying drawings, forming a part of this specification, in which Fig. 1 is a fragmentary view in front elevation, illustrating a lathe equipped with the compensating center of my invention, a portion of the work piece being shown in section.

Fig. 2 is a longitudinal, sectional view, through the center support locked in adjusted position to hold the work piece at a predetermined point, a portion of the work piece being shown in side elevation.

Fig. 3 is a longitudinal, sectional view, similar to Fig. 2, but showing the compensating center support in projected position and the clamping means released.

Fig. 4 is a detail, sectional view taken on the line 4—4 of Fig. 2, showing the gauging member carried by the split nut.

Fig. 5 is a detail, sectional view taken on the line 5—5 of Fig. 2.

Fig. 6 is a detail, sectional view through the release nut, taken on the line 6—6 of Fig. 2, and Fig. 7 is a plan view of the removable gauging member.

In the drawings, the same reference numerals refer to the same parts throughout the several views, and the sectional views are taken looking in the direction of the arrows at the ends of the section lines.

In general, my invention comprises a supporting sleeve having a plunger that is longitudinally adjustable thereof and which has a conical tip adapted to engage in a center hole in the work piece, together with means for clamping the plunger in adjusted position with respect to said sleeve. The means for clamping the plunger in the adjusted position may be operated automatically, upon bringing the work piece engaged with the conical tip to a predetermined position with respect to the sleeve. This automatic clamping means may be actuated by movement of the work piece to a predetermined position. Spring means may be provided for projecting the plunger from the sleeve and I may also provide means for limiting the projection of the plunger. The means for clamping the plunger in adjusted position may take the form of an internally-threaded split nut carried by the sleeve, which is automatically clamped about the plunger by means actuated by movement of the work piece to predetermined position with respect to the sleeve. To that end, the plunger may be provided with an externally-threaded front portion with which the internal threads of the split nut cooperate. The means for automatically clamping the split nut about the plunger may comprise an internal frusto-conical seating surface on the sleeve, and an external frusto-conical surface on the split nut, which surfaces are adapted to have wedging engagement, and means actuated by movement of the work piece to the predetermined position for forcing the split nut longitudinally of the sleeve to clamp it about the plunger. To transmit the movement of the work piece to the split nut, I may provide a gauging member removably mounted on the split nut and adapted to be engaged by the end of the work piece, when the center hole in the latter engages the conical tip of the center support. This gauging member will be removed, after the work piece has been brought to proper position and the center support has been clamped. To release the split nut quickly, I propose to provide a release nut screwed on the sleeve and having an inwardly-extending annular flange projecting between the end of the sleeve and an outwardly-extending annular flange on the split nut. When the release nut is turned in one direction, it engages the annular flange on the split nut and forces the latter out of the recess, thus releasing the clamped plunger and permitting it to be projected. This release nut may be provided with spring means for automatically turning it back to the home position.

Referring to the numbered parts of the drawings, my compensating center support is carried by a supporting sleeve 10 having a tapered exterior, which, as shown in Fig. 1, is mounted in the driving spindle 19 journaled in the headstock 20 of a lathe. The compensating center support includes a plunger 13 having a conical tip 14, which is received in the conical center hole 15 formed in one end of a work piece 16. A similar center hole at the other end of the work piece engages the conical tip 17 of the other center support carried by the tail stock 12, which, in accordance with usual practice, is adjustable toward and from the head stock. The work piece 16 is revolubly mounted between the tips 14 and 17, and rotated, in the usual manner by spindle 19, carrying a face plate 18 having a slot therein, with which engages the laterally-projecting arm 22 of a dog 21, secured to the work piece 16.

The supporting sleeve 10 has a longitudinally-extending bore comprising the front portion 52 and the rear portion 53, between which the sleeve is provided with the inwardly-extending annular flange 47. The forward end of the portion 52 of the bore communicates with a recess 42, which, in turn, communicates with an enlarged recess 43, the mouth of which is provided with an internal frusto-conical seating surface 23 extending to the front end of sleeve 10. The plunger 13 has, as stated, a conical tip 14 on its front end and, just in the rear of said conical tip, it is provided with a head portion 44 provided with the external screw threads 29. A shank 46 extends rearwardly from the plunger 13 through the annular flange 47, in which it is guided, and carries, at its rear end, a stop sleeve 41 held on the shank 46 by the head 49 of a screw, screwed into the rear end of said shank. Engagement of the forward end of stop sleeve 41 with the annular flange 47 limits the projection of the plunger 13 from the sleeve 10. A compression spring 48 surrounds the shank 46 and is interposed between the annular flange 47 and the thrust bearing 45, which engages the plunger 13 at the base of shank 46. This spring 48 tends to project the plunger from sleeve 10.

The head portion 44 of plunger 13 is surrounded by a split nut 24, which, as shown, is made in three sections, 25, 26 and 27, respectively. This split nut is provided with the internal threads 28 for engagement with the external screw threads 29 on the head of plunger 13. The split nut is provided with an external, frusto-conical surface adapted to have wedging engagement with the internal seating surface 23, at the front end of sleeve 10, and, when said split nut is forced into the recess of the sleeve, the cooperation of these frusto-conical surfaces contracts the sections of the split nut about the head of the plunger and clamps the plunger against movement with respect to the nut. Screw 50 carried by sleeve 10 has a stud portion 51 engaging in recess 51', formed in the exterior of the nut section 27, which recess is of such dimensions with respect to stud 51 as to prevent rotation of the split nut with respect to the sleeve and limit the movement of the split nut longitudinally of the sleeve. A compression spring 40, interposed between the base of recess 43 and the rear end of split nut 24, tends to move the split nut out of the sleeve to the extent permitted by stud 51. The forward end of the split nut 24 is provided with an outwardly extending annular flange 30, having an annular groove 31 therein.

A release nut 32 is screwed upon the outer portion of the front end of sleeve 10 and has an inwardly-extending flange 33, interposed between the front end of the sleeve and the annular flange 30 of the split nut. One or more washers 39, of proper thickness, may be interposed between the end of sleeve 10 and flange 33 of the release nut so that the movement of the split nut 24 inwardly of the sleeve may be so limited as to bring about precisely that amount of wedging engagement which will clamp the plunger 13 against rotation with respect to the nut 24. The release nut 32 is provided with a plurality of lugs 38 for rotating the nut, and has a rearwardly-extending flange 34 forming a recess, within which is housed a torsion spring 36, one end of which is connected to the nut at 35 while the other end thereof is connected to the sleeve at 37. This torsion spring tends to screw the release nut 32 on the sleeve into its home or retracted position, in which the flange 33 is as close to the end of the sleeve 10 as it can get.

A removable gauge 54 is provided, having a flange 55 adapted to seat in the annular groove 31 of the split nut, and having a portion 56 extending downwardly toward the conical tip 14, in position to be engaged by the end of the work piece 16 when the center hole in the latter is engaged by said conical tip. This gauge 54 is semi-circular in form so that, when seated on the split nut, its flange 55 will seat in portions of the annular groove 31 in each of the three sections, 25, 26 and 27, of the split nut. This serves to maintain the threads of the split nut sections in accurate alignment when in release position. The gauge 54 may take such form as is suited to the character of the work piece and the location of the gauging surface on the work piece. For instance, when the work piece consists of a tapered arbor on which the work is mounted at some distance from the ends of the arbor, the gauge 54 may have a laterally extending rod or projection for engagement with the gauging surface on the work piece.

The operation of my improved compensating center support should be apparent from the description of the parts given above. Fig. 3 illustrates the plunger 13 in projected position, and the split nut 24 moved outwardly of the recess in the end of sleeve 10, so that it does not clamp the plunger 13 against rotation. The release nut 32 is shown in its home position on the sleeve 10 and it is to be noted that there is a space between the forward face of the release nut 32 and the rear face of the annular flange 30 on the split nut. The gauge member 54 is seated in the annular groove 31 of the split nut and the center hole 15 of the work piece 16 is then engaged with the conical tip 14 on the forward end of plunger 13, and the conical tip 17 of the center support carried by tail stock 12 is engaged with the adjacent center hole in the work piece. Movement of the work piece 16 toward the end of sleeve 10 causes the plunger 13 to move into the recess against the pressure of spring 48, said plunger rotating and the threaded portion 29 of the plunger turning in the internal threads 28 of the split nut. This continues until the end or gauging surface of work piece 16 engages the gauge 54, whereupon continued movement of the work piece 16 through the gauge 54 moves the split nut 24 inwardly of the sleeve 10, until the annular flange 30 engages the front face of the release nut 32, which is in its home position. When that point in the movement is reached, the wedging engagement between the frusto-conical surfaces of the split nut and the sleeve will have clamped the split nut about the head 44 of plunger 13, so as to prevent rotation of said plunger with respect to the nut 24 and thus lock the plunger 13 and the conical tip 14 in the adjusted position, in which the end of the work piece 16 occupies a predetermined position with respect to the end of sleeve 10. The tail stock 12 is adjusted until the tip 17 engages in its center hole with the proper "feel." Thereupon, the gauge 54 is removed and the required work performed on work piece 16, which is revolubly supported between the centers 14 and 17. At the completion of the work, the tail stock is backed off, the work piece removed and the release nut 32 is turned in opposition to the torsion spring 36 and, due to the engagement of the annular flange 33 with the annular flange 30 of the split nut 24, the latter is moved out of the recess to release position, in which plunger 13 may turn freely with respect to nut 24 and sleeve 10. The work piece 16 having been removed, spring 48 is effective to rotate the plunger 13 to project it to the position shown in Fig. 3, in which it is ready to receive another work piece.

I am aware that the devices shown herein are susceptible of considerable variation without departing from the spirit of my invention and, therefore, I claim my invention broadly as indicated by the appended claims.

Having thus described my invention, what I claim as new and useful, and desire to secure by Letters Patent, is:

1. A compensating center for rotatably supporting a work piece comprising the combination of a supporting sleeve, a plunger adjustable longitudinally of said sleeve and having a conical tip adapted to engage in a center hole in a work piece and having an externally threaded portion, and contractable means cooperating with the externally threaded portion of the plunger and actuated by movement of said work piece to a predetermined position with respect to said sleeve for automatically clamping said plunger in adjusted position.

2. A compensating center for rotatably supporting a work piece comprising the combination of a supporting sleeve, a plunger adjustable longitudinally of said sleeve and having a conical tip adapted to engage in a center hole in a work piece, spring means for projecting said plunger from said sleeve, and means including a contractable element surrounding the plunger and actuated by movement of the work piece to a predetermined position with respect to said sleeve for automatically clamping said plunger in adjusted position.

3. A compensating center for rotatably supporting a work piece comprising the combination of a supporting sleeve, a plunger adjustable longitudinally in said sleeve and having a conical tip adapted to engage in a center hole in a work piece, spring means for projecting said plunger from said sleeve, means for limiting the projection of said plunger from said sleeve, and means including a contractable element surrounding the plunger and actuated by movement of the work piece to a predetermined position with respect to said sleeve for automatically clamping said plunger in adjusted position.

4. A compensating center for rotatably supporting a work piece comprising the combination of a supporting sleeve having a longitudinally-extending bore and an annular flange extending inwardly of said bore, a plunger adjustable longitudinally of said bore and having a conical tip at one end thereof adapted to engage in a center hole in a work piece and a shank of reduced diameter at the other end thereof passing through said annular flange, a spring interposed between said flange and said plunger surrounding said shank and tending to project said plunger from the sleeve, a stop sleeve carried by said shank within said bore and adapted to engage said flange to limit the projection of said plunger, and means actuated by movement of the work piece to predetermined position with respect to said sleeve for clamping the plunger in adjusted position.

5. A compensating center for rotatably supporting a work piece comprising the combination of a supporting sleeve, a plunger adjustable longitudinally in said sleeve and having an externally-threaded front end and a conical tip adapted to engage in a center hole in a work piece, an internally-threaded split nut carried by said sleeve and cooperating with the threaded portion of said plunger, and means actuated by movement of the work piece to predetermined position with respect to said sleeve for automatically clamping said nut about said plunger to hold the latter in adjusted position.

6. A compensating center for rotatably supporting a work piece comprising the combination of a supporting sleeve, a plunger adjustable longitudinally in said sleeve and having an externally-threaded front end portion and a conical tip adapted to engage in a center hole in a work piece, an internally-threaded split nut carried by said sleeve and surrounding and adapted to cooperate with the threaded portion of said plunger, means preventing rotation of said nut with respect to said sleeve, spring means acting to rotate said plunger with respect to said split nut to project the plunger, and means actuated by movement of the work piece to predetermined position with respect to the sleeve for automatically clamping said split nut about said plunger to lock the latter in adjusted position.

7. A compensating center for rotatably supporting a work piece comprising the combination of a supporting sleeve having a longitudinally-extending bore communicating at the front end with an enlarged recess having a frusto-conical seating surface, a plunger adjustable in said bore longitudinally of the sleeve and having a front end portion externally threaded and a conical tip adapted to engage in a center hole in a work piece, a split nut housed within said recess and having internal threads cooperating with the threaded portion of said plunger and an external frusto-conical surface adapted to have wedging engagement with the seating surface of said sleeve recess, means preventing rotation of the split nut with respect to the sleeve, and means actuated by movement of the work piece to predetermined position with respect to the sleeve for forcing the split nut longitudinally of the sleeve to clamp it about the plunger and hold the latter in adjusted position.

8. A compensating center for rotatably supporting a work piece comprising the combination of a supporting sleeve having a longitudinally-extending bore communicating at one end with an enlarged recess having a frusto-conical seating surface, a plunger adjustable longitudinally in said bore and recess and having a front end portion externally threaded and a conical tip adapted to engage in a center hole in a work piece, an internally-threaded split nut cooperating with the threaded portion of said plunger and having an external frusto-conical surface adapted to have wedging engagement with the seating surface of said sleeve recess, means for preventing rotation of the split nut with respect to the sleeve, spring means tending to move the split nut outwardly in said recess, and means actuated by movement of the work piece to predetermined position with respect to the sleeve for forcing said split nut into the recess to clamp it about the threaded portion of the plunger and lock the latter in adjusted position.

9. A compensating center for rotatably supporting a work piece comprising the combination of a supporting sleeve having a longitudinally-extending bore communicating at its front end with an enlarged recess having a frusto-conical seating surface, a plunger adjustable longitudinally in said bore and recess and having an externally-threaded front portion and a conical tip adapted to engage in a center hole in a work piece, an internally-threaded split nut cooperating with the threaded portion of said plunger and having an external frusto-conical surface adapted to have wedging engagement with the frusto-conical seating surface of said sleeve recess, means for preventing rotation and limiting longitudinal movement of said split nut with respect to said sleeve, spring means tending to move said split nut outwardly in said sleeve recess, and means actuated by movement of the work piece to predetermined position with respect to said sleeve for moving said split nut into said recess to clamp the same about the threaded portion of said plunger and lock the latter in adjusted position.

10. A compensating center for rotatably supporting a work piece comprising the combination of a supporting sleeve, a plunger adjustable longitudinally in said sleeve and having an externally-threaded front end portion and a conical tip adapted to engage in a center hole in a work piece, an internally-threaded split nut carried by said sleeve surrounding and adapted to cooperate with the threaded portion of said plunger and having an outwardly-extending annular flange at its front end, means preventing rotation of said nut with respect to said sleeve, spring means acting to rotate said plunger with respect to said split nut to project the plunger, a release nut screwed on said sleeve and having an inwardly-extending annular flange interposed between the end of said sleeve and the flange of said nut, and means actuated by movement of the work piece to predetermined position with respect to the sleeve for automatically clamping said split nut about said plunger to lock the latter in adjusted position.

11. A compensating center for rotatably supporting a work piece comprising the combination of a supporting sleeve having a longitudinally-extending bore communicating at the front end with an enlarged recess having a frusto-conical seating surface, a plunger adjustable in said bore longitudinally of the sleeve and having a front end portion externally threaded and a conical tip adapted to engage in a center hole in a work piece, a split nut housed within said recess and having internal threads cooperating with the threaded portion of said plunger, an external frusto-conical surface adapted to have wedging engagement with the seating surface of said sleeve recess and an outwardly-extending annular flange at its front end, means preventing rotation of the split nut with respect to the sleeve, a release nut screwed on the sleeve and having an inwardly-extending annular flange interposed between the end of said sleeve and the annular flange of said split nut, whereby rotation of the release nut to release position forces the split nut outwardly from said recess, and means actuated by movement of the work piece to predetermined position with respect to the sleeve for forcing the split nut into said recess to clamp it about the plunger and hold the latter in adjusted position.

12. A compensating center for rotatably supporting a work piece comprising the combination of a supporting sleeve having a longitudinally-extending bore communicating at the front end with an enlarged recess having a frusto-conical seating surface, a plunger adjustable in said bore longitudinally of the sleeve and having a front end portion externally threaded and a conical tip adapted to engage in a center hole in a work piece, a split nut housed within said recess and having internal threads cooperating with the threaded portion of said plunger, an external frusto-conical surface adapted to have wedging engagement with the seating surface of said sleeve recess and an outwardly-extending annular flange at the front end thereof, means preventing rotation of the split nut with respect to the sleeve, a release nut screwed on the sleeve and having an inwardly-extending annular flange interposed between the end of said sleeve and the annular flange of said split nut, whereby rotation of the release nut upon the sleeve forces said split nut outwardly from the recess to release position, spring means tending to turn said release nut on the sleeve away from release position, and means actuated by movement of the work piece to predetermined position with respect to the sleeve for forcing the split nut longitudinally of the sleeve to clamp it about the plunger and hold the latter in adjusted position.

13. A compensating center for rotatably supporting a work piece comprising the combination of a supporting sleeve, a plunger adjustable longitudinally in said sleeve and having an externally-threaded front end and a conical tip adapted to engage in a center hole in a work piece, an internally-threaded split nut carried by said sleeve and cooperating with the threaded portion of said plunger, and a gauge member removably carried by said split nut and adapted to be engaged by the work piece to transmit longitudinal motion thereof to said split nut for automatically clamping said nut about said plunger to hold the latter in adjusted position.

14. A compensating center for rotatably supporting a work piece comprising the combination of a supporting sleeve, a plunger adjustable longitudinally in said sleeve and having an externally-threaded front end portion and a conical tip adapted to engage in a center hole in a work piece, an internally-threaded split nut carried by said sleeve and surrounding and adapted to cooperate with the threaded portion of said plunger, means preventing rotation of said nut with respect to said sleeve, spring means acting to rotate said plunger with respect to said split nut to project the plunger, and a gauging member removably carried by said split nut and adapted to be engaged by the work piece to transmit longitudinal movement thereof to said split nut to automatically clamp the latter about the plunger and lock the plunger in adjusted position.

15. A compensating center for rotatably supporting a work piece comprising the combination of a supporting sleeve having a longitudinally-extending bore communicating at the front end with an enlarged recess having a frusto-conical seating surface, a plunger adjustable in said bore longitudinally of the sleeve and having a front end portion externally threaded and a conical tip adapted to engage in a center hole in a work piece, a split nut housed within said recess and having internal threads cooperating with the threaded portion of said plunger, an external frusto-conical surface adapted to have wedging engagement with the seating surface of said sleeve recess and an outwardly-extending annular flange at its front end, means preventing rotation of the split nut with respect to the sleeve, and a gauging member removably carried by said split nut and adapted to be engaged by the work piece to force the split nut longitudinally of the sleeve and clamp it about the plunger to hold the latter in adjusted position.

16. A compensating center for rotatably supporting a work piece comprising the combination of a supporting sleeve having a longitudinally-extending bore communicating at the front end with an enlarged recess having a frusto-conical seating surface, a plunger adjustable in said bore longitudinally of the sleeve and having a front end portion externally threaded and a conical tip adapted to engage in a center hole in a work piece, a split nut housed within said recess and having internal threads cooperating with the threaded portion of said plunger, an external frusto-conical surface adapted to have wedging engagement with the seating surface of said sleeve recess and an outwardly-extending annular flange at its front end, means preventing rotation of the split nut with respect to the sleeve, a release nut screwed on said sleeve and having an inwardly-extending annular flange interposed between the end of said sleeve and the flange of said split nut, and a gauging member removably carried by the annular flange of said split nut and having a portion adapted to be engaged by the work piece when the center hole thereof engages the conical tip to transmit motion from said work piece to said split nut to force it longitudinally of the sleeve and clamp it about the plunger to hold the latter in adjusted position.

17. A compensating center for rotatably supporting a work piece comprising the combination of a supporting sleeve having a longitudinally-extending bore communicating at the front end with an enlarged recess having a frusto-conical seating surface, a plunger adjustable in said bore longitudinally of the sleeve and having a front end portion externally threaded and a conical tip adapted to engage in a center hole in a work piece, a split nut housed within said recess and having internal threads cooperating with the threaded portion of said plunger, an external frusto-conical surface adapted to have wedging engagement with the seating surface of said sleeve recess and an outwardly-extending annular flange at its front end, means preventing rotation of the split nut with respect to the sleeve, a release nut screwed on said sleeve and having an inwardly-extending annular flange interposed between the end of said sleeve and the annular flange of said split nut, spring means tending to turn said release nut toward its retracted position, and a gauging member removably carried by the annular flange of said split nut and adapted to be engaged by the work piece when the center hole thereof engages said conical tip for forcing the split nut longitudinally of the sleeve to clamp it about the plunger and hold the latter in adjusted position.

DAVID W. WIREBAUGH.

REFERENCES CITED

The following references are of record in the file of this patent:

UNITED STATES PATENTS

| Number | Name | Date |
| --- | --- | --- |
| 237,487 | Conklin | Feb. 8, 1881 |
| 257,157 | Faught | May 2, 1882 |
| 1,806,344 | Goad | May 19, 1931 |
| 2,209,493 | Tscherne | July 30, 1940 |